(12) United States Patent
Tanaka

(10) Patent No.: US 11,025,879 B2
(45) Date of Patent: Jun. 1, 2021

(54) IMAGE PROCESSING APPARATUS, IMAGE PROCESSING METHOD, AND STORAGE MEDIUM STORING PROGRAM

(71) Applicant: CANON KABUSHIKI KAISHA, Tokyo (JP)

(72) Inventor: Katsumasa Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/378,370

(22) Filed: Apr. 8, 2019

(65) Prior Publication Data
US 2019/0335154 A1    Oct. 31, 2019

(30) Foreign Application Priority Data

Apr. 25, 2018 (JP) .............................. JP2018-083763

(51) Int. Cl.
| | | |
|---|---|---|
| H04N 13/117 | (2018.01) | |
| G06T 7/194 | (2017.01) | |
| G06F 9/30 | (2018.01) | |
| G06F 3/0481 | (2013.01) | |

(52) U.S. Cl.
CPC ....... *H04N 13/117* (2018.05); *G06F 3/04815* (2013.01); *G06F 9/3004* (2013.01); *G06T 7/194* (2017.01)

(58) Field of Classification Search
CPC ... H04N 13/117; G06T 7/194; G06F 3/04815; G06F 9/3004
See application file for complete search history.

(56) References Cited

U.S. PATENT DOCUMENTS

| | | | | |
|---|---|---|---|---|
| 8,626,434 | B1* | 1/2014 | Kornmann | G01C 21/3638 701/400 |
| 9,361,660 | B2* | 6/2016 | Tanaka | G06F 3/04815 |
| 2011/0254958 | A1* | 10/2011 | Kotani | G06T 15/205 348/159 |
| 2013/0100171 | A1* | 4/2013 | Ohba | G09G 5/34 345/672 |
| 2014/0132594 | A1* | 5/2014 | Gharpure | H04N 13/139 345/419 |
| 2018/0227607 | A1* | 8/2018 | Kang | H04N 21/2408 |
| 2018/0295367 | A1* | 10/2018 | Mohammed | H04N 19/87 |

FOREIGN PATENT DOCUMENTS

JP    2011228845 A    11/2011

* cited by examiner

*Primary Examiner* — Xin Sheng

(74) *Attorney, Agent, or Firm* — Canon U.S.A, , Inc. IP Division

(57) ABSTRACT

An image processing apparatus generates a plurality of virtual viewpoint images being temporally consecutive, and includes a data acquisition unit, a parameter acquisition unit, a viewpoint acquisition unit, and a generation unit. The data acquisition unit is configured to acquire image data that is obtained by capturing images in a plurality of directions by a plurality of image capturing devices. The parameter acquisition unit is configured to acquire a parameter related to the acquired image data and related to quality of the plurality of virtual viewpoint images. The viewpoint acquisition unit is configured to acquire viewpoint information representing a moving path of a virtual viewpoint. The generation unit is configured to generate the plurality of virtual viewpoint images according to a virtual viewpoint having a moving speed based on the acquired image data. The moving speed being determined based on the acquired parameter and the acquired viewpoint information.

18 Claims, 8 Drawing Sheets

IMAGE PROCESSING APPARATUS, IMAGE PROCESSING METHOD, AND STORAGE MEDIUM STORING PROGRAM

BACKGROUND

Field of the Disclosure

The present disclosure relates to an image processing apparatus, an image processing method, and a storage medium storing a program.

Description of the Related Art

In these days, a technology for placing a plurality of cameras at different locations, synchronously capturing an image of an object from multiple viewpoints, and generating a virtual viewpoint content (virtual viewpoint image) by using multiple-viewpoint images obtained through the capture has become a focus of attention, and is generally referred to as free-viewpoint video generation. With the technology for generating a virtual viewpoint content from multiple-viewpoint images, for example, highlights of soccer games or basketball games can be watched from various viewpoints. Therefore, virtual viewpoint contents can give users a sense of realism higher than image contents captured by a single camera.

On the other hand, generating virtual viewpoint contents requires images captured by a plurality of cameras, and therefore the amount of data transmission and the number of instruments at the time of generation of contents increase as compared to image contents made from images captured by a single camera. For this reason, a technology for selecting a camera appropriate for a virtual viewpoint content to be generated has been developed (Japanese Patent Laid-Open No. 2011-228845).

If a system that generates virtual viewpoint contents does not take measures against viewers' recognizing deterioration of image quality of the generated virtual viewpoint contents, the level of viewer satisfaction decreases. Causes of deterioration of image quality include the followings. For example, because of an increase in the amount of data transmission or the number of instruments in the system that generates virtual viewpoint contents, various kinds of trouble due to a failure of a transmission path and a malfunction of an apparatus can occur. On the influence of the trouble, part of captured images can be lost. For example, when there is trouble in the system or when a likelihood of trouble in the system is found, the number of captured images to be used to generate a virtual viewpoint content is reduced, the frame rate is decreased, or the bit precision of images is reduced. Thus, the amount of data transmission in the system is reduced, and a failure of the system can be avoided. However, on the other hand, when the amount of data of images to be used to generate a virtual viewpoint content is reduced in this way, the image quality of the virtual viewpoint content that is generated by using the images may deteriorate accordingly.

SUMMARY

An image processing apparatus generates a plurality of virtual viewpoint images being temporally consecutive. The image processing apparatus includes a data acquisition unit, a parameter acquisition unit, a viewpoint acquisition unit, and a generation unit. The data acquisition unit is configured to acquire image data that is obtained by capturing images in a plurality of directions by a plurality of image capturing devices. The parameter acquisition unit is configured to acquire a parameter related to the acquired image data and related to quality of the plurality of virtual viewpoint images. The viewpoint acquisition unit is configured to acquire viewpoint information representing a moving path of a virtual viewpoint. The generation unit is configured to generate the plurality of virtual viewpoint images according to a virtual viewpoint having a moving speed based on the acquired image data. The moving speed being determined based on the acquired parameter and the acquired viewpoint information.

Further features of the present disclosure will become apparent from the following description of exemplary embodiments with reference to the attached drawings.

DESCRIPTION OF THE EMBODIMENTS

Hereinafter, an embodiment of the present disclosure will be described in detail with reference to the accompanying drawings. In the present embodiment, a virtual viewpoint content (virtual viewpoint video) is a moving image content. That is, a virtual viewpoint content contains virtual viewpoint images that are a plurality of temporally consecutive still images. A virtual viewpoint content is roughly classified into two types, that is, a static virtual viewpoint content and a dynamic virtual viewpoint content. A static virtual viewpoint content is a virtual viewpoint content that is generated based on a plurality of images captured by a plurality of cameras (image capturing devices) at substantially the same time in different directions. That is, a static virtual viewpoint content is like an image when a still object is viewed from a designated virtual viewpoint. The location or direction or both of a virtual viewpoint may change in a static virtual viewpoint content. On the other hand, a dynamic virtual viewpoint content is a content that is generated based on a plurality of images captured by a plurality of cameras in different directions for a certain period of time (a plurality of images each corresponding to a plurality of consecutive capturing times). That is, a dynamic virtual viewpoint content is like an image when an object that changes with a lapse of time is viewed from a designated virtual viewpoint. The location or direction or both of a virtual viewpoint may change in a dynamic virtual viewpoint content as well.

Figure 1:
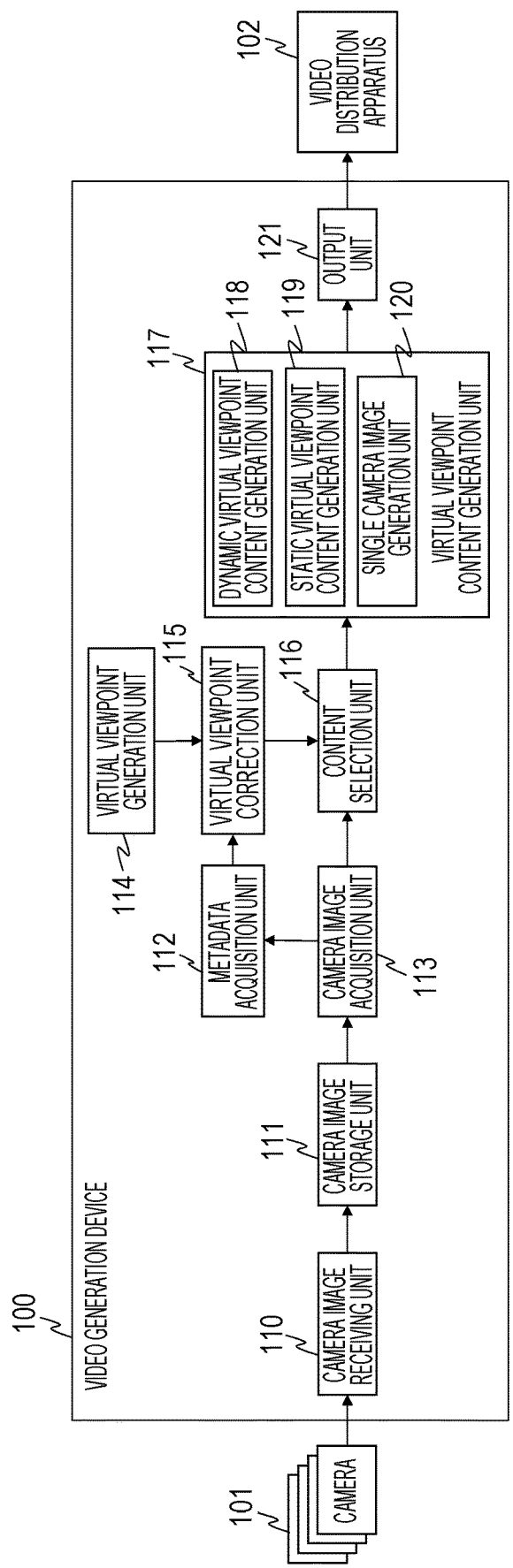
FIG. 1 is a block diagram showing an example of the configuration of a video generation device.

FIG. 1 is a view showing an example of the configuration of a video generation system according to the present embodiment. The video generation system includes a video generation device 100, a camera group 101, and a video distribution apparatus 102. The camera group 101 includes a plurality of cameras. The camera group 101 transmits multiple-viewpoint images of the cameras associated with metadata to the video generation device 100. The metadata contains time information (time length information), information about data deficiency and redundancy, bit precision, frame rate, and the number of cameras. The video generation device 100 consecutively receives multiple-viewpoint images synchronously captured by the camera group 101, and generates a virtual viewpoint content based on a virtual viewpoint or an image based on a selected one single camera. The video generation device 100 also interlaces a virtual viewpoint content with a single camera image, and transmits the interlaced data to the video distribution apparatus 102.

Next, the configuration of the video generation device 100 will be described. The video generation device 100 includes a camera image receiving unit 110, a camera image storage unit 111, and a camera image acquisition unit 113. The video generation device 100 acquires and transmits images. The video generation device 100 includes a metadata acquisition unit 112, a virtual viewpoint generation unit 114, a virtual viewpoint correction unit 115, and a content selection unit 116. The video generation device 100 handles information associated with images. The video generation device 100 includes a virtual viewpoint content generation unit 117, and an output unit 121. The video generation device 100 handles both images and information associated with the images. The virtual viewpoint content generation unit 117 includes a dynamic virtual viewpoint content generation unit 118, a static virtual viewpoint content generation unit 119, and a single camera image generation unit 120.

The camera image receiving unit 110 receives images captured at each time and information associated with the captured images from the camera group 101, and transmits the captured images and the associated information to the camera image storage unit 111. The camera image storage unit 111 receives images and metadata associated with the images from the camera image receiving unit 110, and stores the images and the metadata in a storage device inside the camera image storage unit 111. The camera image storage unit 111 transmits images and metadata associated with the images in response to a request from the camera image acquisition unit 113. When time information of images for which the camera image acquisition unit 113 makes a request is close to a time at which the images are stored in the storage device, the camera image storage unit 111 may transmit the images and the associated metadata without storing the images and the associated metadata in the storage device or may transmit the images and the associated metadata to the camera image acquisition unit 113 and store the images and the associated metadata at the same time.

The camera image acquisition unit 113 acquires required images and metadata associated with the images from the camera image storage unit 111. The camera image acquisition unit 113 transmits the images to the content selection unit 116, and transmits the metadata associated with the images to the metadata acquisition unit 112. The metadata contains parameters, such as the number of cameras used to acquire image data and the bit precision, frame rate, and amount of data of images, and data deficiency information. These parameters and data deficiency information influence the quality of virtual viewpoint video to be generated. The metadata acquisition unit 112 keeps the number of cameras, bit precision, frame rate, and data deficiency information received from the camera image acquisition unit 113, and transmits those data in response to a request from the virtual viewpoint correction unit 115. Image data that the camera image acquisition unit 113 acquires may be data representing a plurality of images captured by the plurality of cameras or may be data representing foreground images that are portions corresponding to foreground objects, such as moving objects, and extracted from a plurality of captured images.

The virtual viewpoint generation unit 114 generates a virtual camera path in response to an instruction of a user (content creator). The virtual viewpoint generation unit 114 is an example of a viewpoint acquisition unit for acquiring viewpoint information representing a moving path of a virtual viewpoint. A virtual camera path represents the movement of a virtual viewpoint by associating the virtual viewpoint for which the user makes a request with time information associated with the virtual viewpoint in time order irrespective of locations at which the camera group 101 is placed. That is, a virtual camera path is viewpoint information that represents a moving path of a virtual viewpoint related to generation of virtual viewpoint images.

The virtual viewpoint correction unit 115 corrects the virtual camera path generated by the virtual viewpoint generation unit 114 based on information received from the metadata acquisition unit 112, and transmits the corrected virtual camera path to the content selection unit 116. The virtual viewpoint correction unit 115 is an example of a determination unit for determining a moving speed of a virtual viewpoint based on an acquired parameter and an acquired viewpoint information. The virtual viewpoint correction unit 115 is also an example of a limiting unit for limiting a moving speed of a virtual viewpoint associated with a plurality of virtual viewpoint images to be generated to within a predetermined range based on an acquired parameter. The virtual viewpoint correction unit 115 is also an example of a decision unit for deciding whether to apply a determined moving speed depending on user operation. The virtual viewpoint correction unit 115 is also an example of a changing unit for changing a moving speed of a virtual viewpoint according to an acquired viewpoint information based on an acquired parameter and the acquired viewpoint information. The details of a correction method will be described later with reference to the flowchart of FIG. 2.

The content selection unit 116 transmits a virtual viewpoint content selection request to the virtual viewpoint content generation unit 117 based on the virtual camera path received from the virtual viewpoint correction unit 115. The content selection unit 116, at the same time, transmits the images of the camera group 101, received from the camera image acquisition unit 113, and the virtual camera path received from the virtual viewpoint correction unit 115 to the virtual viewpoint content generation unit 117.

The virtual viewpoint content generation unit 117 receives the images of the camera group 101 and the virtual camera path from the content selection unit 116. The virtual viewpoint content generation unit 117 activates any one of the dynamic virtual viewpoint content generation unit 118, the static virtual viewpoint content generation unit 119, and the single camera image generation unit 120, and generates a virtual viewpoint content based on the virtual viewpoint content selection request from the content selection unit 116. The virtual viewpoint content generation unit 117 transmits the generated virtual viewpoint content to the output unit 121. However, when the virtual viewpoint content selection request from the content selection unit 116 is to activate the single camera image generation unit 120, the virtual viewpoint content generation unit 117 transmits not a virtual viewpoint content but a single camera image to the output unit 121. The dynamic virtual viewpoint content generation unit 118 generates a dynamic virtual viewpoint content, and transmits the dynamic virtual viewpoint content to the output unit 121. The static virtual viewpoint content generation unit 119 generates a static virtual viewpoint content, and transmits the static virtual viewpoint content to the output unit 121. The single camera image generation unit 120 generates a single camera image, and transmits the single camera image to the output unit 121. As described above, the virtual viewpoint content generation unit 117 is able to generate a virtual viewpoint content based on images captured by the plurality of cameras that make up the camera group 101 and a virtual camera path that the virtual viewpoint correction unit 115 outputs.

The output unit 121 outputs a virtual viewpoint content or single camera image, received from the virtual viewpoint content generation unit 117, to the video distribution apparatus 102. The video distribution apparatus 102 is able to display the virtual viewpoint content or the single camera image.

Figure 2A:
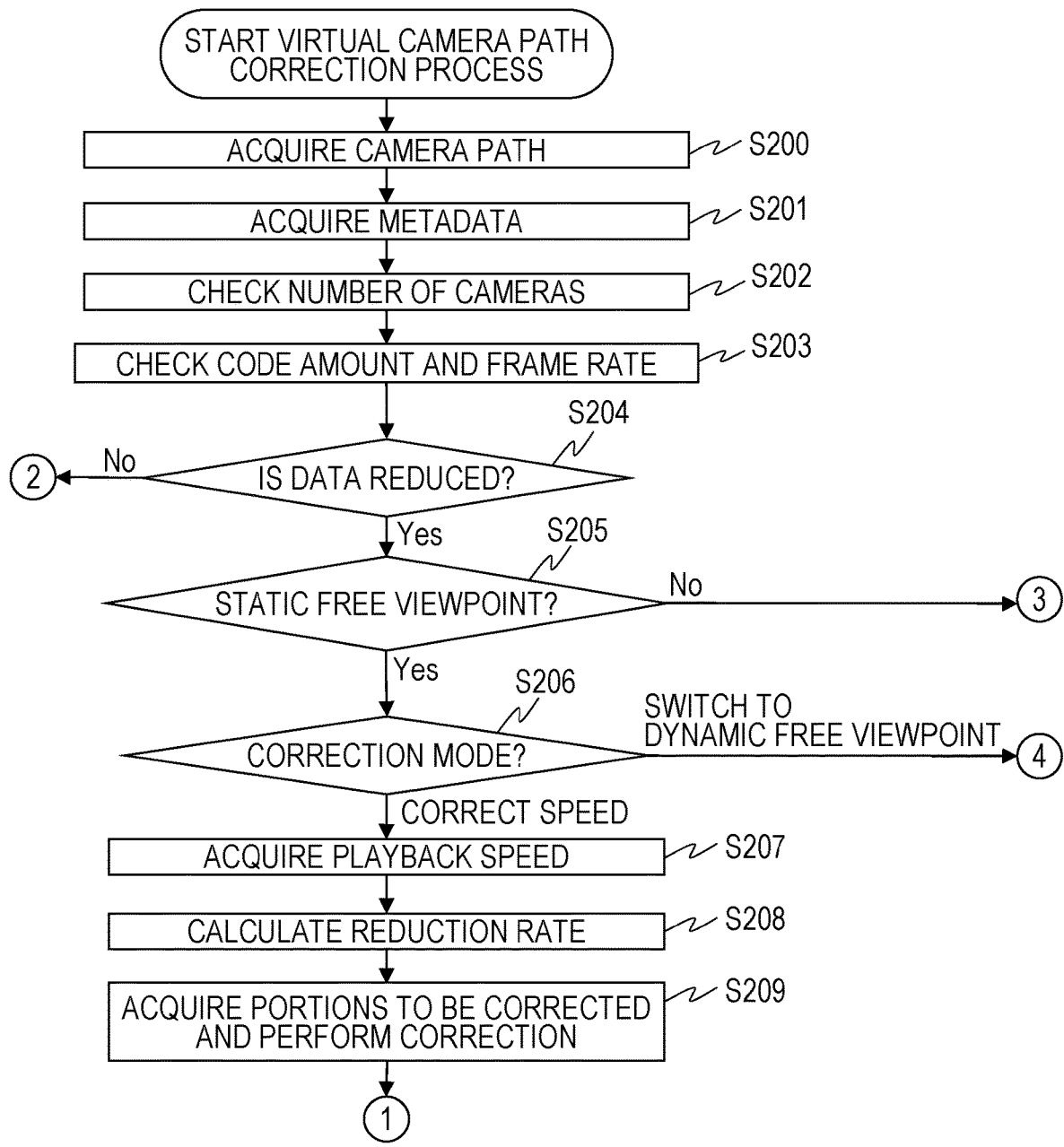
FIGS. 2A and 2B are a flowchart showing a control method for the video generation device.
Figure 2B:
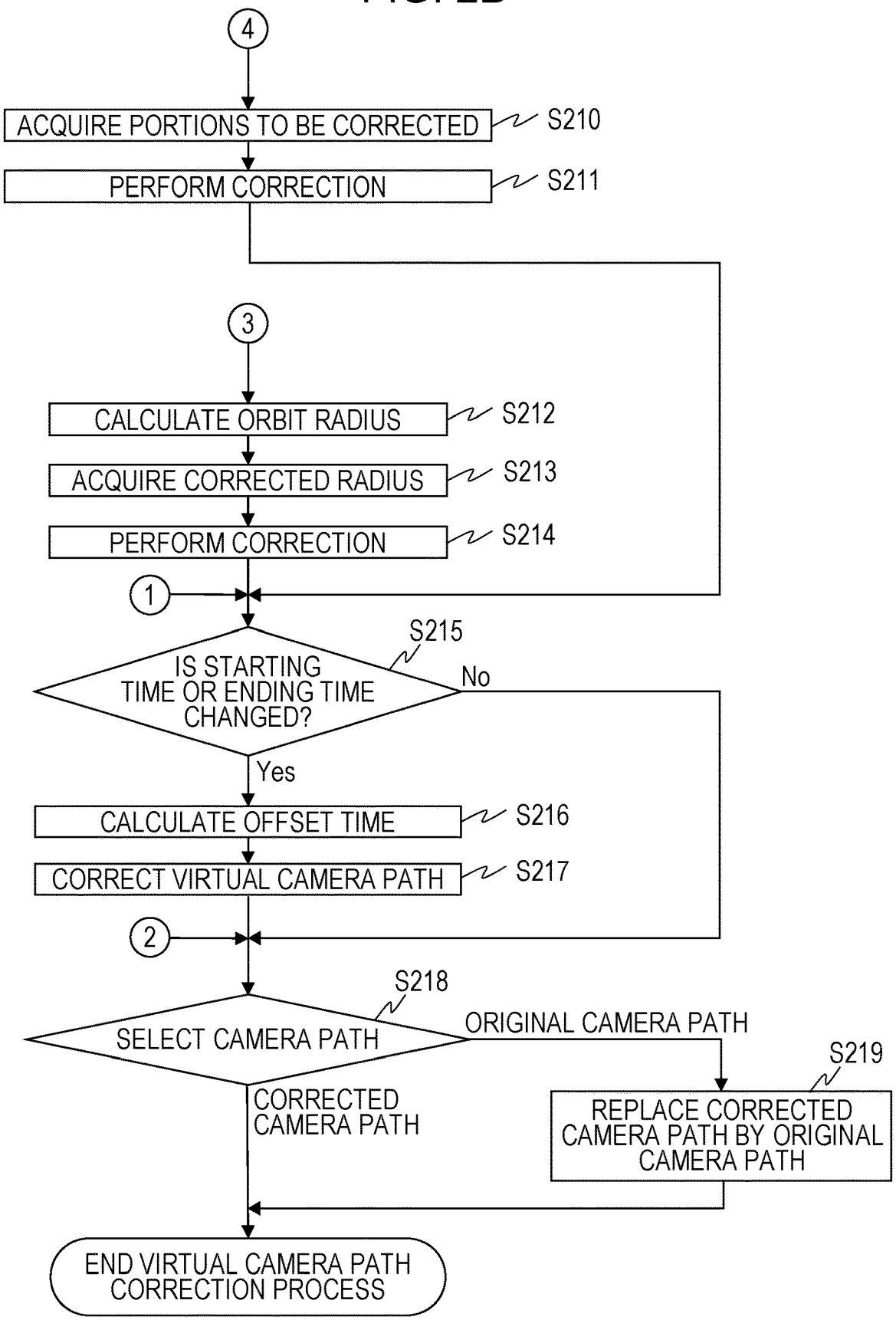

FIG. 2 is a flowchart showing a control method for the video generation device 100. Hereinafter, the operation that the virtual viewpoint correction unit 115 corrects a virtual camera path that is acquired from the virtual viewpoint generation unit 114 will be described.

In step S200, the virtual viewpoint correction unit 115 acquires a virtual camera path from the virtual viewpoint generation unit 114, and the process proceeds to step S201. In step S201, the virtual viewpoint correction unit 115 acquires metadata from the metadata acquisition unit 112, and the process proceeds to step S202. This metadata contains the number of cameras, bit precision, frame rate, and data deficiency information.

In step S202, the virtual viewpoint correction unit 115 determines the number of active cameras by consulting the meta data acquired in step S201, and the process proceeds to step S203. In step S203, the virtual viewpoint correction unit 115 determines information related to the amount of code (amount of data) of the captured images by consulting the meta data acquired in step S201, and the process proceeds to step S204. Information related to the amount of code of image contains, for example, bit precision, frame rate, and data deficiency information.

In step S204, the virtual viewpoint correction unit 115 determines whether the amount of code of images based on image capturing is reduced based on the information checked in step S202 and step S203. Examples of the case where the amount of code of images based on image capturing is reduced include the case where the number of active cameras has reduced, the case where the number of captured images that are used to generate a virtual viewpoint content among a plurality of images captured by a plurality of active cameras has reduced, and the case where the bit precision or frame rate or both of captured images have decreased. When the virtual viewpoint correction unit 115 determines that the amount of code of images is not reduced, the process proceeds to step S218; whereas, when the virtual viewpoint correction unit 115 determines that the amount of code of images is reduced, the process proceeds to step S205. Images based on image capturing for determination as to the amount of code may be captured images themselves or may be images that are obtained through predetermined image processing on captured images.

For example, when the virtual viewpoint correction unit 115 determines that the amount of code of images based on image capturing at an intended time (intended time point) is less than the amount of code of images based on image capturing at a time (time point) before the intended time, the process proceeds to step S205; otherwise, the process proceeds to step S218. Alternatively; when the virtual viewpoint correction unit 115 determines that the amount of code of images based on image capturing at an intended time is less than a reference amount of code, set by the user, the process proceeds to step S205; otherwise, the process proceeds to step S218. Alternatively, when the virtual viewpoint correction unit 115 determines that there is a data deficiency of images based on image capturing at an intended time, the process proceeds to step S205; otherwise, the process proceeds to step S218. The virtual viewpoint correction unit 115 determines whether the amount of code of images is reduced by using one or more of the above-described plurality of determinations. A method of determining whether the amount of code of images is reduced is not limited to these determinations.

In step S205, the virtual viewpoint correction unit 115 checks the virtual camera path acquired from the virtual viewpoint generation unit 114, and determines whether the virtual camera path indicates a static virtual viewpoint content. When the virtual viewpoint correction unit 115 determines that the virtual camera path indicates a static virtual viewpoint content, the process proceeds to step S206. When the virtual viewpoint correction unit 115 determines that the virtual camera path does not indicate a static virtual viewpoint content, the process proceeds to step S212.

In step S206, the virtual viewpoint correction unit 115 selects whether to increase the playback speed of the static virtual viewpoint content or to switch to a dynamic virtual viewpoint content depending on user's setting. When the virtual viewpoint correction unit 115 selects to increase the playback speed of the static virtual viewpoint content, the process proceeds to step S207. When the virtual viewpoint correction unit 115 selects to switch to a dynamic virtual viewpoint content, the process proceeds to step S210.

In step S207, the virtual viewpoint correction unit 115 acquires a correction rate of the playback speed of the static virtual viewpoint content depending on user's setting, and the process proceeds to step S208. For example, the correction rate of the playback speed is 200% and is higher than 100%.

In step S208, the virtual viewpoint correction unit 115 calculates a reduction rate from the correction rate of the playback speed acquired in step S207, and the process proceeds to step S209. For example, when the correction rate of the playback speed is 200%, the virtual viewpoint correction unit 115 sets the reduction rate to 50% (one frame is removed out of two frames). As the playback speed of virtual viewpoint video increases, a playback duration of the virtual viewpoint video shortens, and an apparent moving speed of the virtual viewpoint increases. That is, the moving speed of the virtual viewpoint in virtual viewpoint video to be played back is determined to a speed higher than the moving speed for the virtual camera path designated by the user.

In step S209, the virtual viewpoint correction unit 115 corrects the virtual camera path so as to remove frames of the static virtual viewpoint content for the reduction rate, and the process proceeds to step S215. The virtual viewpoint correction unit 115 corrects the virtual camera path of a first static virtual viewpoint content into the virtual camera path of a second static virtual viewpoint content obtained by shortening the playback duration of the first static virtual viewpoint content. For example, the playback duration of the second static virtual viewpoint content is half the playback duration of the first static virtual viewpoint content. The corrected virtual camera path will be described later with reference to the timing chart of FIG. 6. After that, the virtual viewpoint content generation unit 117 generates a second static virtual viewpoint content based on the corrected virtual camera path with the static virtual viewpoint content generation unit 119.

In step S210, the virtual viewpoint correction unit 115 acquires a span of time required for correction in the virtual camera path, and the process proceeds to step S211. The span of time required for correction represents a span of time of the static virtual viewpoint content.

In step S211, the virtual viewpoint correction unit 115 corrects the virtual camera path of the static virtual viewpoint content into the virtual camera path of a dynamic virtual viewpoint content over the span of time required for correction and acquired in step S210, and the process proceeds to step S215. The details of the correction will be described later with reference to the timing chart of FIG. 3. After that, the virtual viewpoint content generation unit 117 generates a dynamic virtual viewpoint content based on the corrected virtual camera path with the dynamic virtual viewpoint content generation unit 118.

Figure 4:
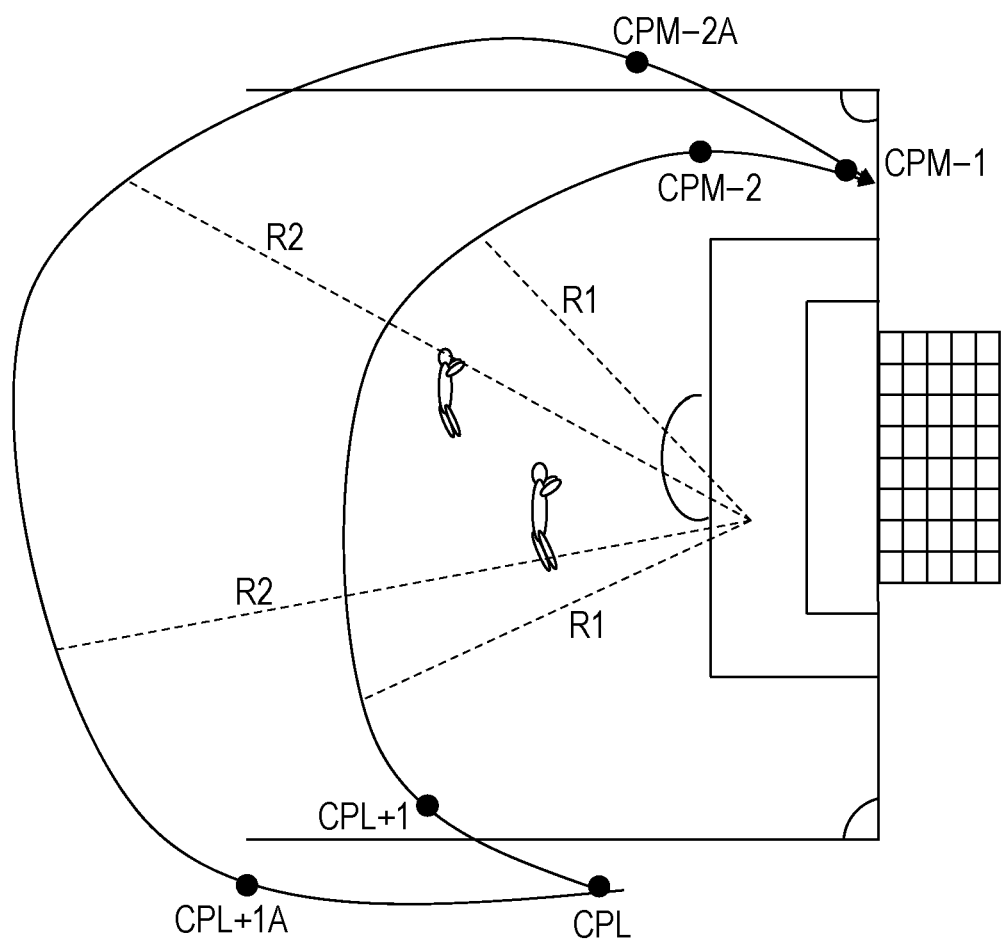
FIG. 4 is a view showing a relationship between an original orbit radius and a corrected orbit radius.

In step S212, the virtual viewpoint correction unit 115 calculates the orbit radius of the virtual viewpoint, and the process proceeds to step S213. It is assumed that the moving path of the virtual viewpoint, represented by the virtual camera path, is a substantially circular orbit. The orbit radius is calculated from the virtual viewpoint described in the virtual camera path. FIG. 4 is a view showing a virtual camera path before and after the orbit radius is corrected. The orbit radius of the original virtual viewpoint is R1.

In step S213, the virtual viewpoint correction unit 115 acquires the orbit radius of the corrected virtual viewpoint depending on user's setting, and the process proceeds to step S214. The orbit radius of the corrected virtual viewpoint may be set at the maximum scale factor and the maximum radius. In FIG. 4, the orbit radius of the corrected virtual viewpoint is R2. The orbit radius R2 is greater than the orbit radius R1.

In step S214, the virtual viewpoint correction unit 115 corrects the virtual viewpoint of the virtual camera path as shown in FIG. 4 based on the information of the orbit radius acquired in step S212 and step S213, and the process proceeds to step S215. The virtual viewpoint correction unit 115 corrects the virtual camera path of a first dynamic virtual viewpoint content into the virtual camera path of a second dynamic virtual viewpoint content of which the orbit radius of the virtual viewpoint is greater than that of the first dynamic virtual viewpoint content. After that, the virtual viewpoint content generation unit 117 generates a second dynamic virtual viewpoint content based on the corrected virtual camera path with the dynamic virtual viewpoint content generation unit 118.

In this way, the moving amount of the virtual viewpoint increases as a result of control executed by the virtual viewpoint correction unit 115, while, on the other hand, the playback duration of the virtual viewpoint video remains unchanged. Therefore, the moving speed of the virtual viewpoint increases. That is, the moving speed of the virtual viewpoint in the virtual viewpoint video to be played back is determined to a speed higher than the moving speed appropriate for the virtual camera path designated by the user. However, the configuration of the correction control is not limited thereto. The playback duration of virtual viewpoint video may be changed with a change in the moving amount of the virtual viewpoint.

Whether a low image quality of virtual viewpoint video is conspicuous depends on the distance between a virtual viewpoint and an object. Therefore, the moving speed of the virtual viewpoint may be determined based on the distance between the location of a virtual viewpoint and an object. For example, as the distance between an object and the location of a virtual viewpoint represented by a virtual camera path reduces, the moving speed of the virtual viewpoint may be increased.

In step S215, the virtual viewpoint correction unit 115 determines whether to correct the starting time or ending time of the dynamic virtual viewpoint content or static virtual viewpoint content. When the virtual viewpoint correction unit 115 determines to correct the starting time or the ending time, the process proceeds to step S216. When the virtual viewpoint correction unit 115 determines not to correct the starting time or the ending time, the process proceeds to step S218.

In step S216, the virtual viewpoint correction unit 115 calculates offset time and corrects the starting time or ending time of the dynamic virtual viewpoint content or static virtual viewpoint content based on the offset time, and the process proceeds to step S216. The details of the process of step S216 will be described later with reference to the flowchart of FIG. 5. In step S217, the virtual viewpoint correction unit 115 corrects the virtual camera path based on the correction of step S216, and the process proceeds to step S218.

In step S218, the virtual viewpoint correction unit 115 selects whether to adopt the corrected virtual camera path or to adopt the original virtual camera path. Selection depends on user operation that the content creator performs. That is, the virtual viewpoint correction unit 115 determines whether to apply the moving speed of the changed virtual viewpoint to the virtual camera path depending on user operation. When the virtual viewpoint correction unit 115 adopts the original virtual camera path, the process proceeds to step S219. When the virtual viewpoint correction unit 115 adopts the corrected virtual camera path, the virtual viewpoint correction unit 115 transmits the corrected virtual camera path to the content selection unit 116, and then the process ends. In step S219, the virtual viewpoint correction unit 115 transmits the original virtual camera path to the content selection unit 116 in place of the corrected virtual camera path, and then the process ends.

In the above-described example, the moving speed of a virtual viewpoint is automatically determined based on a virtual camera path designated by the user and parameters related to image quality; however, determination of the moving speed of a virtual viewpoint is not limited to this configuration. The video generation device 100 may limit the moving speed of a virtual viewpoint to within a predetermined range based on parameters related to image quality. For example, when a virtual camera path associated with a moving speed outside the limited predetermined range is input through user operation, the video generation device 100 may inform the user of the input virtual camera path or may show error indication. In addition, for example, the video generation device 100 may reject user operation for inputting a virtual camera path associated with a moving speed outside the limited predetermined range.

Figure 3:
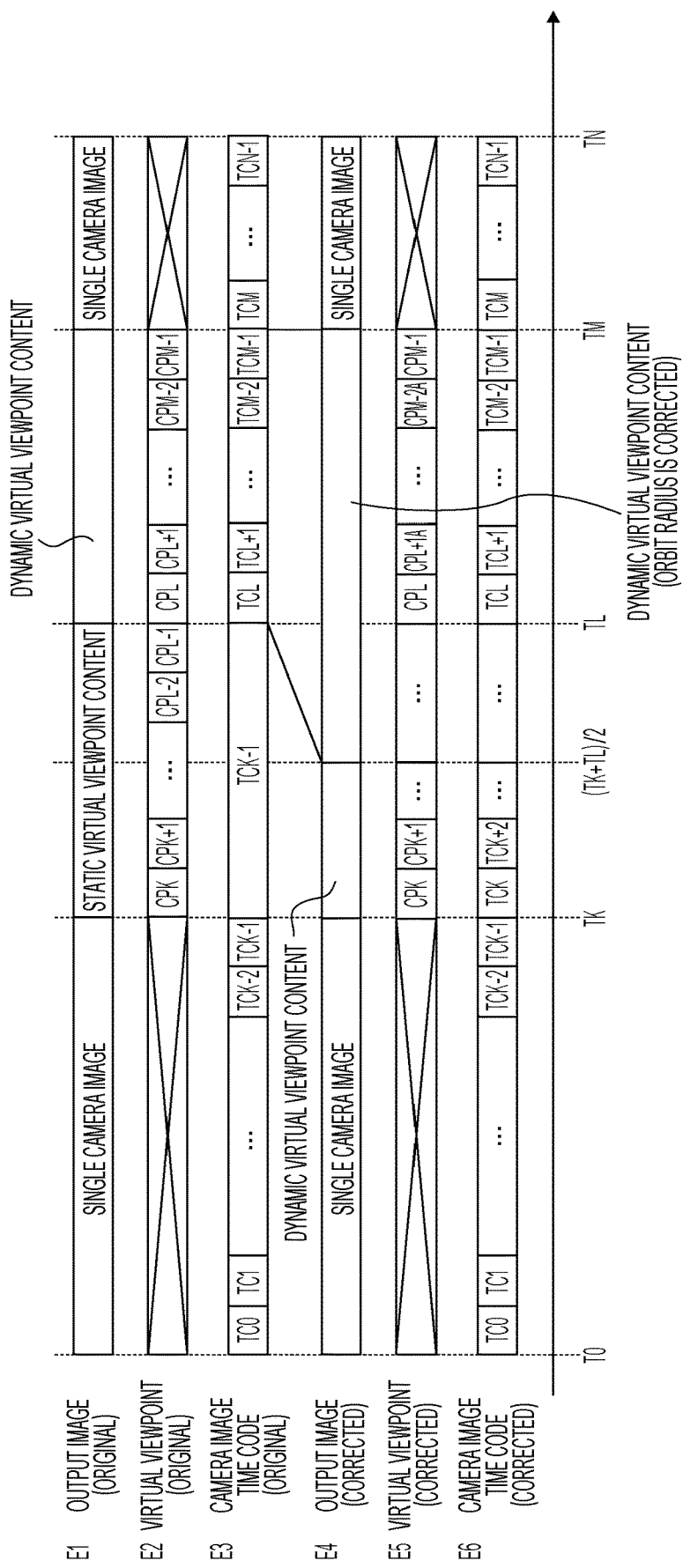
FIG. 3 is a timing chart showing the control method for the video generation device.

FIG. 3 is a timing chart showing a control method for the video generation device 100, and shows a process in the case where the virtual viewpoint correction unit 115 determines not to change the starting time or the ending time in step S215 and then the process proceeds to step S218. FIG. 3 is a time-series timing chart showing an output image of the video generation device 100 and a virtual camera path composed of a virtual viewpoint and time information in the case where the operation of FIG. 2 is performed in comparison with the case where the operation of FIG. 2 is not performed.

The abscissa axis represents time. In the ordinate axis, E1 to E3 respectively represent the original output image of the video generation device 100, the original virtual viewpoint, and the original time information (camera image time code) in the case where the operation of FIG. 2 is not performed. E4 to E6 respectively represent the corrected output image of the video generation device 100, the corrected virtual viewpoint, and the corrected time information (camera image time code) in the case where the operation of FIG. 2 is performed.

From time T0 to time TK, the virtual viewpoint generation unit 114 generates a virtual camera path so as to generate a single camera image. From time TK to time TL, the virtual viewpoint generation unit 114 generates a virtual camera path so as to generate a static virtual viewpoint content. From time TL to time TM, the virtual viewpoint generation unit 114 generates a virtual camera path so as to generate a dynamic virtual viewpoint content. From time TM to time TN, the virtual viewpoint generation unit 114 generates a virtual camera path so as to generate a single camera image. From time TK to time TM, the virtual viewpoint correction unit 115 determines that the amount of code is reduced.

The virtual viewpoint correction unit 115 corrects the virtual camera path through the process of FIG. 2 such that the static virtual viewpoint content in the output image E1 from time TK to time TL is replaced by the dynamic virtual viewpoint content in the output image E4 from time TK to time (TK+TL)/2. The virtual viewpoint correction unit 115 also corrects the virtual camera path appropriate for the dynamic virtual viewpoint content in the output image E4 from time TK to time (TK+TL)/2 such that the virtual viewpoint E2 and the time information E3 are connected into the virtual viewpoint E5 and the time information E6.

The content selection unit 116 acquires the virtual camera path corrected by the virtual viewpoint correction unit 115, and transmits the corrected virtual camera path to the virtual viewpoint content generation unit 117. The virtual viewpoint content generation unit 117 generates a dynamic virtual viewpoint content appropriate for the corrected virtual camera path. Thus, the static virtual viewpoint content can be replaced by the dynamic virtual viewpoint content.

Subsequently, the virtual viewpoint correction unit 115 replaces the dynamic virtual viewpoint content in the output image E1 from time TL to time TM by a dynamic virtual viewpoint content, of which the orbit radius is corrected, in the output image TA from time (TK+TL)/2 to time TM through the process of FIG. 2. As shown in FIG. 4, the original orbit radius is R1, and the corrected orbit radius is R2. Then, the virtual viewpoint correction unit 115 corrects the virtual viewpoint E2 and the time information E3 into the virtual viewpoint E5 and the time information E6 for the dynamic virtual viewpoint content in the output image E4 from time (TK+TL)/2 to time TM.

As shown in FIG. 3 and FIG. 4, the dynamic virtual viewpoint content in the original virtual viewpoint E2 contains virtual viewpoints CPL, CPL+1, CPM−2, CPM−1. The dynamic virtual viewpoint content in the corrected virtual viewpoint E5 contains virtual viewpoints CPL, CPL+1A, CPM−2A, CPM−1.

Thus, the video generation device 100 is able to correct a virtual camera path and generate a virtual viewpoint content appropriate for the corrected virtual camera path. As a result, in a span of time in which images of which the amount of code is reduced are used within the playback duration of a virtual viewpoint content, the effect of making it hard for viewers to recognize deterioration of image quality is obtained by increasing the amount of change in moving image, increasing the speed of movement of an object, or increasing the distance from a virtual viewpoint to the object. While making it hard to recognize deterioration of image quality, the difference between a virtual camera path instructed by the content creator and a corrected camera path is reduced, with the result that a virtual viewpoint content that meets an intention of the content creator is generated.

Figure 5:
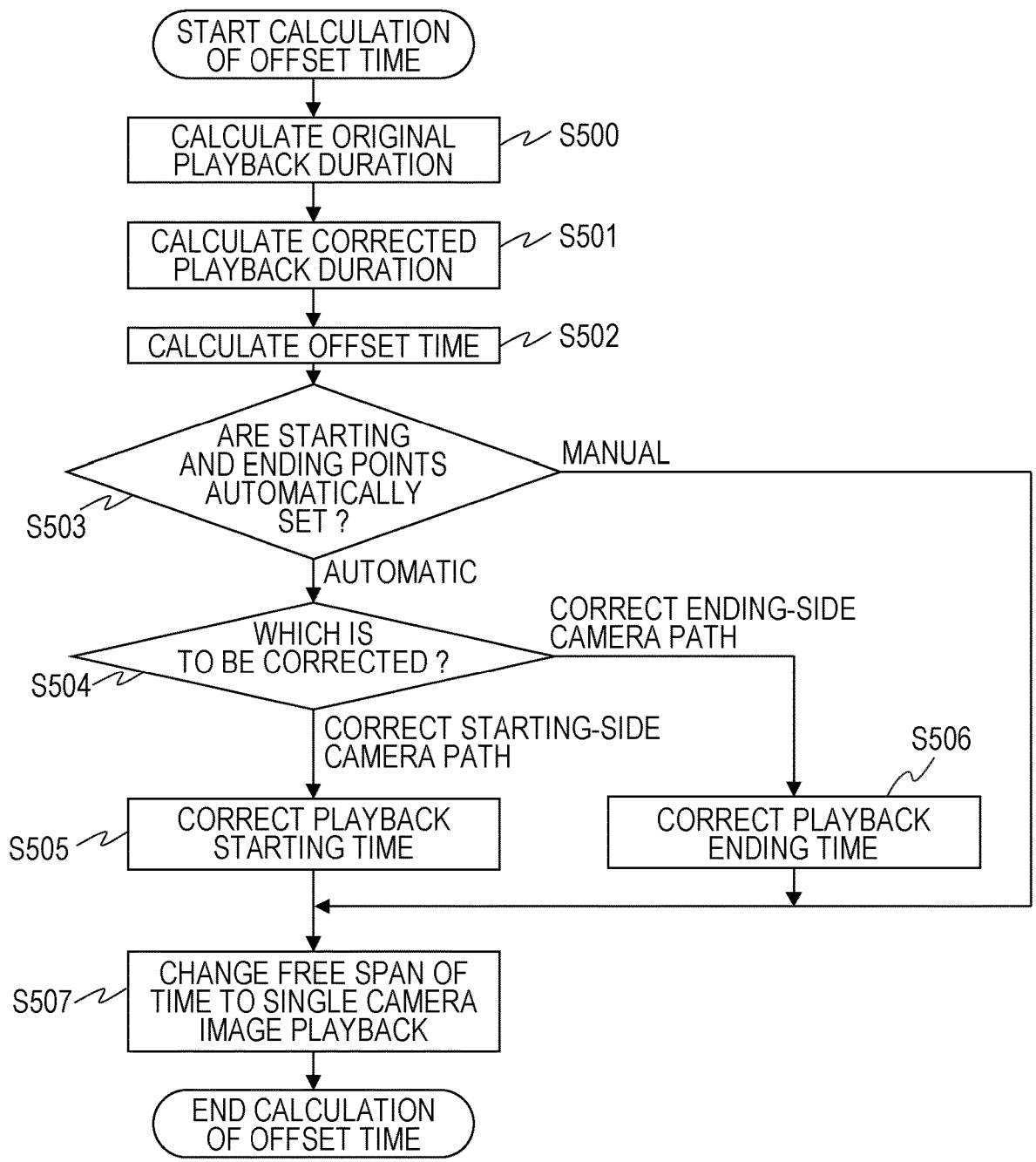
FIG. 5 is a flowchart showing the control method for the video generation device.

FIG. 5 is a flowchart showing the details of the offset time calculation process in step S216 of FIG. 2, and illustrates an operation to change the starting or ending time of a virtual camera path. In step S500, the virtual viewpoint correction unit 115 extracts the playback starting time and playback ending time of the original visual camera path acquired from the virtual viewpoint generation unit 114, calculates the playback duration of the original virtual camera path, and the process proceeds to step S501. For example, the virtual viewpoint correction unit 115 calculates a playback duration TL to TM of the dynamic virtual viewpoint content in the original output image E1 of FIG. 3.

In step S501, the virtual viewpoint correction unit 115 extracts the playback starting time and playback ending time of the corrected virtual camera path, calculates the playback duration of the corrected virtual camera path, and the process proceeds to step S502. For example, the virtual viewpoint correction unit 115 calculates a playback duration (TK+TL)/2 to TM of the dynamic virtual viewpoint content in the corrected output image E4 of FIG. 3.

In step S502, the virtual viewpoint correction unit 115 calculates the difference between the original playback duration calculated in step S500 and the corrected playback duration calculated in step S501 as offset time, and the process proceeds to step S503. For example, the virtual viewpoint correction unit 115 calculates the difference between the playback duration TL to TM of the dynamic virtual viewpoint content in the original output image E1 of FIG. 3 and the playback duration (TK+TL)/2 to TM of the dynamic virtual viewpoint content in the corrected output image E4 of FIG. 3 as offset time.

In step S503, the virtual viewpoint correction unit 115 checks whether adjustment of starting and ending points is set to automatic adjustment or manual adjustment. Setting is performed by the user. When the virtual viewpoint correction unit 115 determines that the adjustment is manual adjustment, the process proceeds to step S507. When the virtual viewpoint correction unit 115 determines that the adjustment is automatic adjustment, the process proceeds to step S504.

In step S504, the virtual viewpoint correction unit 115 determines whether to correct the playback starting time of the virtual camera path or to correct the playback ending time of the virtual camera path based on a predetermined condition or user's setting. When the virtual viewpoint correction unit 115 determines to correct the playback starting time of the virtual camera path, the process proceeds to step S505. When the virtual viewpoint correction unit 115 determines to correct the playback ending time of the virtual camera path, the process proceeds to step S506.

In step S506, the virtual viewpoint correction unit 115 corrects the playback ending time created by the virtual viewpoint generation unit 114 into a time earlier by the offset time calculated in step S502, and the process proceeds to step S507. For example, the virtual viewpoint correction unit 115 corrects the playback ending time TM of the dynamic virtual viewpoint content in the output image E4 of FIG. 3 into the playback ending time TM−(TL−TK)/2 of the dynamic virtual viewpoint content in the output image E4 of FIG. 6.

In step S505, the virtual viewpoint correction unit 115 corrects the playback starting time created by the virtual viewpoint generation unit 114 into a time later by the offset time calculated in step S502, and the process proceeds to step S507.

In step S507, the virtual viewpoint correction unit 115 changes the free span of time resulting from the above-described correction to the playback duration of a single camera image. For example, the virtual viewpoint correction unit 115 changes a span of time from time TM−(TL−TK)/2 to time TM of the output image E4 of FIG. 6 to the playback duration of a single camera image.

As described above, the virtual viewpoint correction unit 115 corrects the virtual camera path of a first virtual viewpoint content into the virtual camera path of a second virtual viewpoint content in step S209, step S211, or step S214 of FIG. 2. The virtual viewpoint correction unit 115 further corrects the virtual camera path in step S216 and step S217 such that part of the second virtual viewpoint content is changed to a single camera image. After that, the virtual viewpoint content generation unit 117 generates a second virtual viewpoint content, part of which is changed to a single camera image, based on the corrected virtual camera path.

Figure 6:
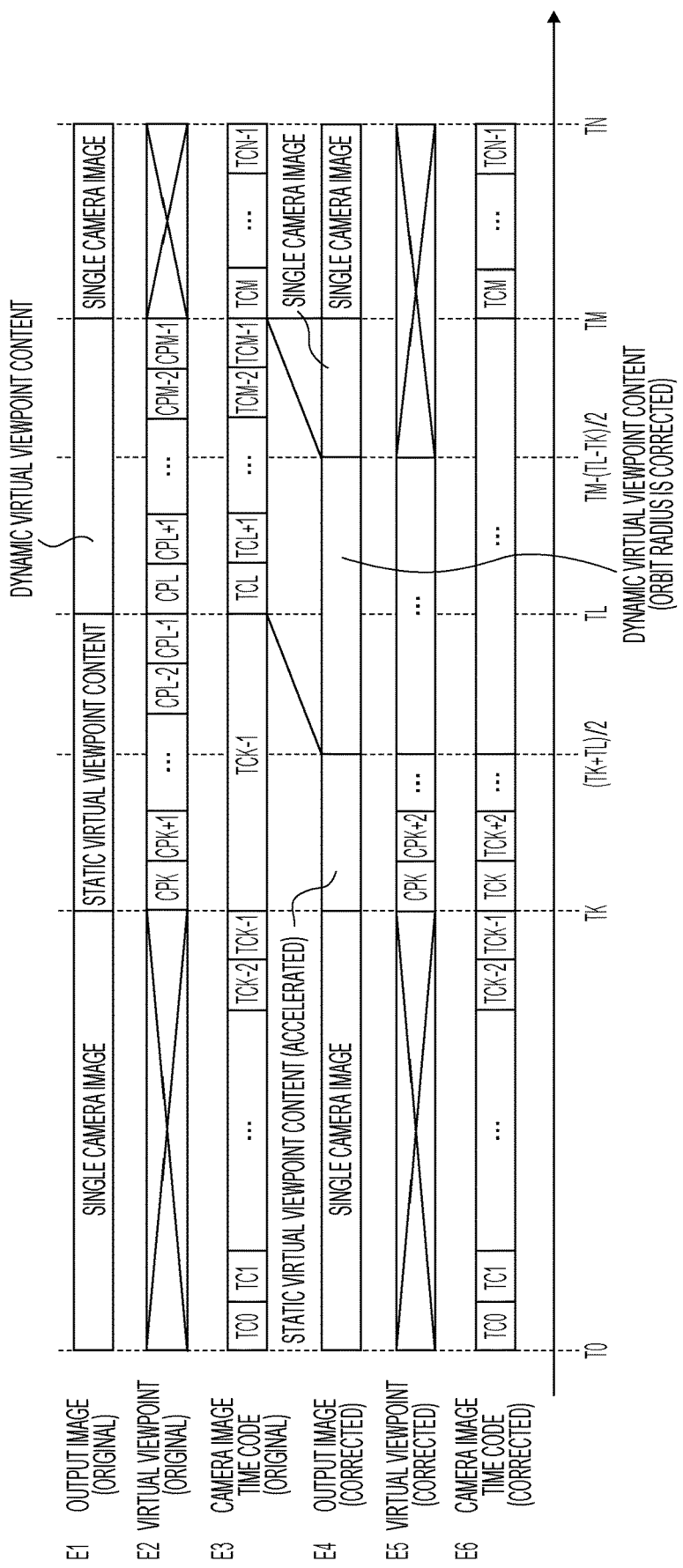
FIG. 6 is a timing chart showing the control method for the video generation device.

FIG. 6 is a timing chart showing the control method for the video generation device 100, and shows a process in the case where the virtual viewpoint correction unit 115 determines to change the starting time or the ending time in step S215 of FIG. 2 and the process proceeds to step S216. FIG. 6 is a time-series timing chart showing an output image of the video generation device 100 and a virtual camera path composed of a virtual viewpoint and time information in the case where the operation of FIG. 2 is performed in comparison with the case where the operation of FIG. 2 is not performed. FIG. 6 illustrates a process in which the virtual viewpoint correction unit 115 corrects the playback starting time or playback ending time of the virtual camera path and changes a free span of time to a single camera image.

The abscissa axis represents time. In the ordinate axis, E1 to E3 respectively represent the output image of the video generation device 100, the virtual viewpoint, and the time information in the case where the operation of FIG. 2 is not performed. E4 to E6 respectively represent the output image of the video generation device 100, the virtual viewpoint, and the time information in the case where the operation of FIG. 2 is performed. E1 to E3 of FIG. 6 are the same as E1 to E3 of FIG. 3.

The virtual viewpoint correction unit 115 corrects the virtual camera path such that the static virtual viewpoint content in the output image E1 from time TK to time TL is replaced by a static virtual viewpoint content in the output image E4 from time TK to time (TK+TL)/2.

The virtual viewpoint correction unit 115 corrects the orbit radius of the dynamic virtual viewpoint content in the output image E1 from time TL to time TM, and corrects the virtual camera path such that the dynamic virtual viewpoint content in the output image E1 from time TL to time TM is replaced by a dynamic virtual viewpoint content in the output image E4 from time (TK+TL)/2 to TM−(TL−TK)/2. Then, the virtual viewpoint correction unit 115 corrects the virtual view point E2 and the time information E3 that compose the virtual camera path into the virtual viewpoint E5 and the time information E6 as a result of the replacement of the dynamic virtual viewpoint content.

Subsequently, since no image content is designated, the virtual viewpoint correction unit 115 executes the operation of the flowchart of FIG. 5, and corrects the virtual camera path such that the virtual camera path is changed to play back a single camera image in the output image E4 from time TM−(TL−TK)/2 to TM.

As described above, the video generation device 100 is able to provide an image that does not make viewers experience a feeling of strangeness by correcting the playback starting time or playback ending time of a dynamic virtual viewpoint content and adding playback of a single camera image. In addition, the effect of making it hard to recognize deterioration of image quality resulting from a reduction in the amount of code is obtained.

Figure 7:
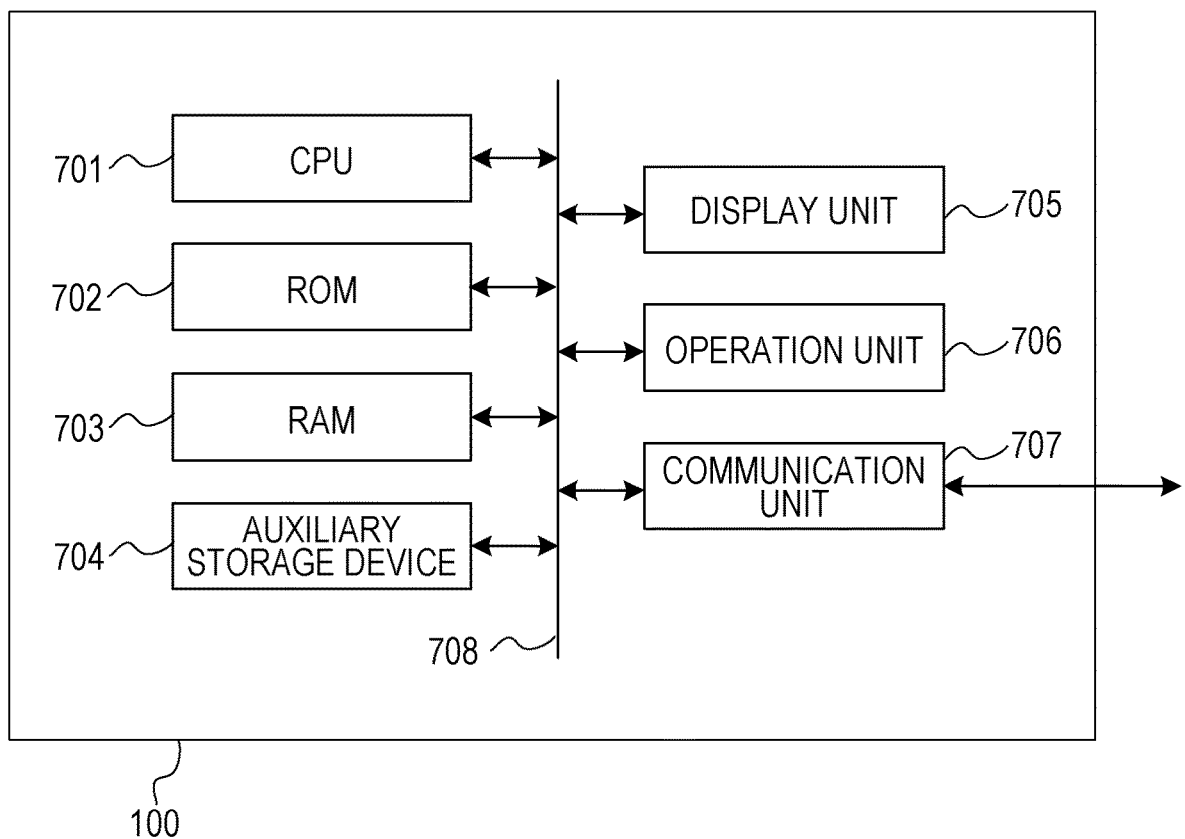
FIG. 7 is a block diagram showing an example of the hardware configuration of the video generation device.

FIG. 7 is a block diagram showing an example of the hardware configuration of the video generation device 100 for implementing the functional components shown in FIG. 1 through software processing. The video generation device 100 includes a CPU 701, a ROM 702, a RAM 703, an auxiliary storage device 704, a display unit 705, an operation unit 706, a communication unit 707, and a bus 708.

The CPU 701 controls the overall video generation device 100 by using computer programs and data stored in the ROM 702 or the RAM 703. The ROM 702 stores programs and parameters that do not need to be changed. The RAM 703 temporarily stores programs and data that are supplied from the auxiliary storage device 704, data that is supplied from an external device via the communication unit 707, or other information. The auxiliary storage device 704 is, for example, a hard disk drive or another storage device. The auxiliary storage device 704 stores content data, such as still images and moving images.

The display unit 705 is, for example, a liquid crystal display or another display. The display unit 705 displays a graphical user interface (GUI) or other interfaces for allowing the user to operate the video generation device 100. The operation unit 706 is made up of, for example, a keyboard and a mouse, or other input devices. The operation unit 706 inputs various instructions to the CPU 701 upon receiving user operation. The communication unit 707 communicates with external devices, such as the camera group 101 and the video distribution apparatus 102 in FIG. 1. For example, when the video generation device 100 is connected to the external devices by wire, a LAN cable or another cable is connected to the communication unit 707. When the video generation device 100 has a function of wirelessly communicating with the external devices, the communication unit 707 includes an antenna. The bus 708 links the units of the video generation device 100 and carries information.

For example, part of the process of the video generation device 100 may be executed by an FPGA and the other part of the process may be implemented by software processing using a CPU. The elements of the video generation device 100 shown in FIG. 7 may be made up of a single electronic circuit or may be made up of a plurality of electronic circuits. For example, the video generation device 100 may include a plurality of electronic circuits each configured to operate as the CPU 701. When the plurality of electronic circuits executes the process in parallel as the CPU 701, the processing speed of the video generation device 100 is increased.

In the present embodiment, the display unit 705 and the operation unit 706 are present in the video generation device 100. Alternatively, the video generation device 100 does not need to include at least one of the display unit 705 and the operation unit 706. Alternatively, at least one of the display unit 705 and the operation unit 706 may be present as another device outside the video generation device 100, and the CPU 701 may operate as a display control unit configured to control the display unit 705 and an operation control unit configured to control the operation unit 706.

The present disclosure may also be implemented by a process in which a program that implements one or more functions of the above-described embodiment is supplied to a system or a device via a network or a storage medium and one or more processors in a computer of the system or device read out and execute the program. In addition, the present disclosure may also be implemented by a circuit (for example, ASIC) that implements one or more functions.

In step S204 of FIG. 2, the virtual viewpoint correction unit 115 determines whether the amount of code of images that are used to generate a virtual viewpoint content is reduced; however, determination is not limited thereto. The virtual viewpoint correction unit 115 may determine whether the image quality of a virtual viewpoint content to be generated is decreased. When the virtual viewpoint correction unit 115 determines that the image quality of the virtual viewpoint content is decreased, the process proceeds to step S205. When the virtual viewpoint correction unit 115 determines that the image quality of the virtual viewpoint content is not decreased, the process proceeds to step S218.

For example, the video generation device 100 may temporarily generate a virtual viewpoint content for a virtual camera path designated by the user, determine the image quality of the temporarily generated virtual viewpoint content, and, when the image quality is decreased, regenerate a virtual viewpoint content by correcting the virtual camera path. Specifically, when the virtual viewpoint correction unit 115 determines that the image quality of a temporary virtual viewpoint content at an intended time is lower than the image quality at a time before the intended time, the process proceeds to step S205; whereas the process proceeds to step S218.

Alternatively, when the virtual viewpoint correction unit 115 determines that the image quality of a temporary virtual viewpoint content at an intended time is lower than reference image quality, the process may proceed to step S205; otherwise, the process may proceed to step S218. A method of determining the image quality of a virtual viewpoint content may include an existing method, such as image analysis based on learning. Alternatively, the image quality of a temporary virtual viewpoint content displayed on a display unit may be evaluated by the content creator, and the evaluated result may be input to the video generation device 100.

According to the present embodiment, even when the image quality of a virtual viewpoint content can decrease, a virtual camera path is corrected such that a decrease in image quality is hard to be recognized, and a virtual viewpoint content is generated while incorporating an intention of the content creator. Therefore, viewers are allowed to view a virtual viewpoint content without any feeling of strangeness.

The above-described embodiment only illustrates a specific example in carrying out the present disclosure, and the technical scope of the present disclosure should not be interpreted restrictively. The present disclosure may be implemented in various forms without departing from the technical idea or main characteristics of the present disclosure.

According to the above-described embodiment, the possibility that a decrease in the image quality of a virtual viewpoint content is recognized by viewers is reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-083763 filed Apr. 25, 2018, which is hereby incorporated by reference herein in its entirety.

What is claimed is:

1. An image processing apparatus comprising:
one or more hardware processors; and
one or more memories storing one or more programs configured to be executed by the one or more hardware processors, the one or more programs including instructions for:
acquiring image data based on image capturing by a plurality of image capturing devices and a parameter which is associated with the image data and is associated with a quality of a virtual viewpoint image to be generated based on the image;
receiving a user operation for determining viewpoint information for specifying a moving path of a virtual viewpoint and a first speed indicating a moving speed of the virtual viewpoint;
in a case where the acquired parameter meets a predetermined criteria, generating, based on the acquired image data and the received user operation, a plurality of virtual viewpoint images corresponding to the first speed; and
in a case where the acquired parameter does not meet the predetermined criteria, generating, based on the acquired image data and the received user operation, a plurality of virtual viewpoint images corresponding to a second-speed-indicating a moving speed of a virtual viewpoint faster than the first speed.

2. The image processing apparatus according to claim 1, wherein
the predetermined criteria includes a criteria that the quality of the virtual viewpoint image specified based on the acquired parameter is higher than a predetermined quality.

3. The image processing apparatus according to claim 1, wherein
the second speed is determined based on a distance between a location of an object in an image capturing area captured by the plurality of image capturing devices, and a location of the virtual viewpoint specified by the acquired viewpoint information.

4. The image processing apparatus according to claim 1, wherein
in a case where the acquired parameter does not meet a predetermined criteria, the plurality of virtual viewpoint images corresponding to the second speed is generated by shortening a playback duration of the plurality of virtual viewpoint images corresponding to the first speed.

5. The image processing apparatus according to claim 1, wherein
in a case where the acquired parameter does not meet a predetermined criteria, the plurality of virtual viewpoint images corresponding to the second speed is generated by lengthening the moving path specified based on the viewpoint information in a predetermined playback duration of the plurality of virtual viewpoint images.

6. The image processing apparatus according to claim 5, wherein
the moving path specified based on the viewpoint information is a circular orbit, and
in a case where the acquired parameter does not meet the predetermined criteria, a radius of the a circular orbit is changed to a radius that is greater than the radius of the circular orbit specified based on the viewpoint information.

7. The image processing apparatus according to claim 1, wherein
the acquired image data includes at least one of data representing a captured image obtained by a plurality of image capturing devices and data representing a foreground image which represents a position of a specific object and is generated based on the captured images.

8. The image processing apparatus according to claim 1, wherein
the parameter is data for specifying the number of image capturing devices used to obtain the image data, and
the predetermined criteria includes a criteria that the number of image capturing devices specified based on the acquired parameter is greater than a predetermined number.

9. The image processing apparatus according to claim 1, wherein
the parameter is data for specifying an amount of code of the image data, and
the predetermined criteria includes a criteria that the amount of code of the image data specified based on the acquired parameter is greater than a predetermined amount of code.

10. The image processing apparatus according to claim 9, wherein
the parameter indicates at least one of bit precision, frame rate, and data amount of the image data.

11. The image processing apparatus according to claim 1, wherein
the one or more programs further includes instructions for determining, based on a user operation, whether to apply the changed viewpoint information to generating a virtual viewpoint image,
in a case where applying the changed viewpoint information is determined, the plurality of virtual viewpoint images corresponding to the second speed are generated, and
in a case where not applying the changed viewpoint information is determined, the plurality of virtual viewpoint images corresponding to the first speed are generated.

12. The image processing apparatus according to claim 1, wherein
the one or more programs further includes instructions for limiting the moving speed of a virtual viewpoint determined based on a user operation to within a predetermined range based on the acquired parameter.

13. The image processing apparatus according to claim 1, wherein
the one or more programs further includes instructions for determining, based on the acquired parameter, whether the plurality of virtual viewpoint images are generated based on image data corresponding to a single capturing time of a plurality of image capturing devices or the plurality of virtual viewpoint images are generated based on image data corresponding to a plurality of consecutive capturing times of a plurality of image capturing devices.

14. The image processing apparatus according to claim 13, wherein
in a case where the quality of a virtual viewpoint image specified based on the acquired parameter is higher than a predetermined quality, the plurality of virtual viewpoint images is generated based on image data corresponding to a single capturing time of a plurality of image capturing devices, and
in a case where the quality of a virtual viewpoint image specified based on the acquired parameter is not higher than a predetermined quality, the plurality of virtual viewpoint images is generated based on image data corresponding to a plurality of consecutive capturing times of a plurality of image capturing devices.

15. An image processing method of generating a plurality of virtual viewpoint images being temporally consecutive, the image processing method comprising:
acquiring image data based on image capturing by a plurality of image capturing devices and a parameter which is associated with the image data and is associated with a quality of a virtual viewpoint image to be generated based on the image;
receiving a user operation for determining viewpoint information for specifying a moving path of a virtual viewpoint and a first speed indicating a moving speed of the virtual viewpoint;
in a case where the acquired parameter meets a predetermined criteria, generating, based on the acquired image data and the received user operation, a plurality of virtual viewpoint images corresponding to the first speed; and in a case where the acquired parameter does not meet the predetermined criteria, generating, based on the acquired image data and the received user operation, a plurality of virtual viewpoint images corresponding to a speed indicating a moving speed of a virtual viewpoint is faster than the first speed.

16. The image processing method according to claim 15, wherein the predetermined criteria that the quality of the virtual viewpoint image specified based on the acquired parameter is higher than a predetermined quality.

17. The image processing method according to claim 15, wherein

The second speed is determined based on a distance between a location of an object in an image capturing area captured by the plurality of image capturing devices, and a location of the virtual viewpoint specified by the acquired viewpoint information.

18. A non-transitory computer-readable storage medium storing a program for causing a computer to execute an image processing method, the image processing method comprising:

acquiring image data based on image capturing by a plurality of image capturing devices and a parameter which is associated with the image data and is associated with a quality of a virtual viewpoint image to be generated based on the image;

receiving a user operation for determining viewpoint information for specifying a moving path of a virtual viewpoint and a first speed indicating a moving speed of the virtual viewpoint;

in a case where the acquired parameter meets a predetermined criteria, generating, based on the acquired image data and the received user operation, a plurality of virtual viewpoint images corresponding to the first speed; and in a case where the acquired parameter does not meet the predetermined criteria, generating, based on the acquired image data and the received user operation, a plurality of virtual viewpoint images corresponding to a speed indicating a moving speed of a virtual viewpoint faster than the first speed.

* * * * *